No. 778,473. PATENTED DEC. 27, 1904.
C. H. BOND & W. C. MALOZ.
MEASURING VESSEL.
APPLICATION FILED FEB. 18, 1904.

2 SHEETS—SHEET 1.

Charles H. Bond and
Walter C. Maloz,
Inventors.

Witnesses by
Attorneys

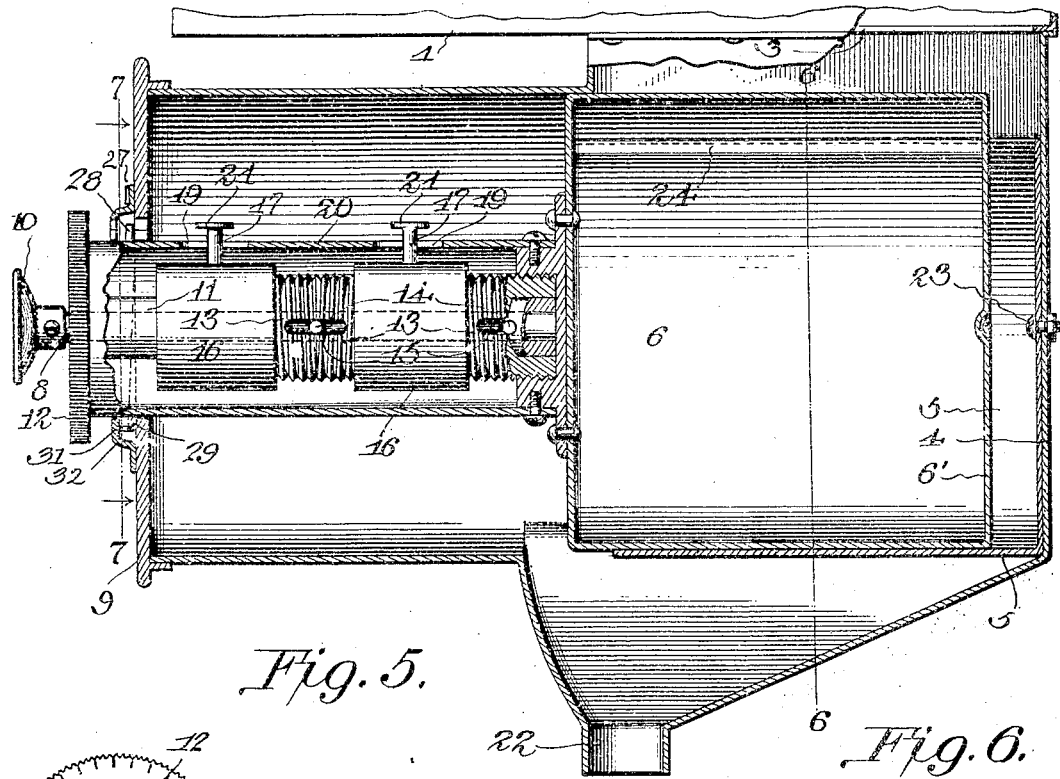

No. 778,473. Patented December 27, 1904.

UNITED STATES PATENT OFFICE.

CHARLES HENRY BOND AND WALTER CHRISTIAN MALOZ, OF PATTERSON, LOUISIANA.

MEASURING VESSEL.

SPECIFICATION forming part of Letters Patent No. 778,473, dated December 27, 1904.

Application filed February 18, 1904. Serial No. 194,290.

*To all whom it may concern:*

Be it known that we, CHARLES HENRY BOND and WALTER CHRISTIAN MALOZ, citizens of the United States, residing at Patterson, in the parish of St. Mary and State of Louisiana, have invented a new and useful Measuring Vessel, of which the following is a specification.

This invention relates to measuring and computing vessels, and particularly to a bin or canister for use in stores and adapted as its contents are discharged to measure and compute the price of the same, and has for its object to produce a comparatively simple inexpensive device of this character for efficiently performing said operations.

To these ends the invention comprises the novel features of construction and combination of parts more fully hereinafter described.

Figure 1:
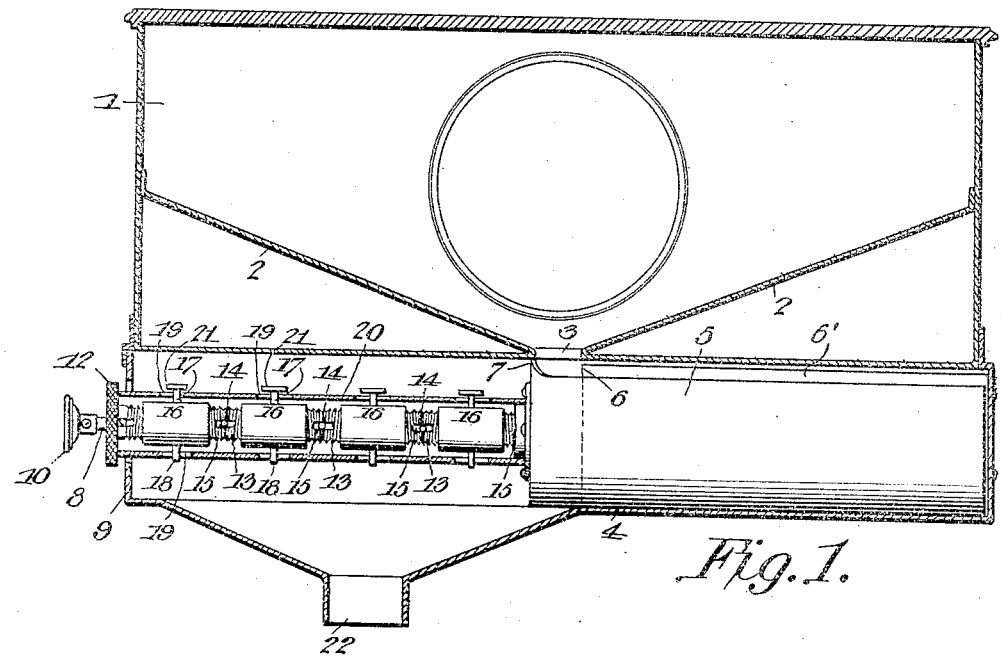
Figure 2:
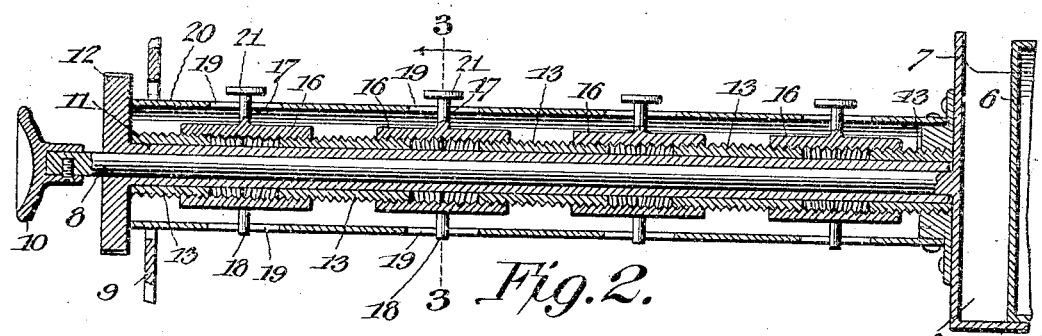
Figures 3, 4:
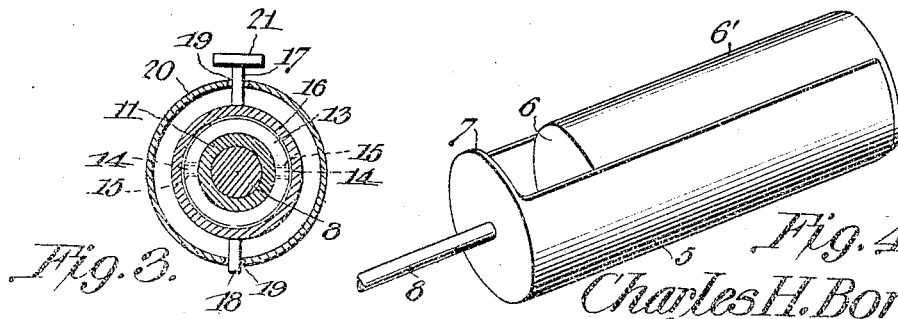

In the accompanying drawings, Figure 1 is a front sectional elevation of a device embodying the invention. Fig. 2 is a longitudinal section, on an enlarged scale, of the calculating mechanism. Fig. 3 is a transverse section on the line 3 3 of Fig. 2. Fig. 4 is a detail perspective view of the removable receptacle. Fig. 5 is a vertical sectional elevation of another form of embodiment of the invention. Fig. 6 is a transverse section on line 6 6 of Fig. 5. Fig. 7 is a transverse section on line 7 7 of Fig. 5. Fig. 8 is a detail view of one of the buttons carried by the computing mechanism. Fig. 9 is a detail view illustrating the graduations for regulating the adjustment of the computing mechanism.

Referring to the drawings, 1 designates a vessel or bin having suitable side and end walls, a top, and a bottom composed of a pair of downwardly-inclined sections or members 2, constituting a discharge-chute leading to a central discharge-opening 3, beneath which and within a supplemental casing 4, detachably secured beneath the vessel 1, there is disposed a longitudinally-movable receptacle or scoop 5, the forward end of which normally ranges beneath the opening. The receptacle 5, the rear end of which is open, has disposed therein and in line with one edge of the opening 3 a vertical shield or partition 6, formed by one end of a cylindrical body 6', maintained in fixed position relative to the longitudinally-movable scoop and constituting a rear closure for the latter. This shield or closure 6 is normally spaced from the front wall 7 of the receptacle, whereby these parts receive between them material escaping from the vessel into the receptacle, and the quantity of material received by the latter may be varied or regulated according to the forward movement of the receptacle.

Attached to the front end wall 7 of the scoop is one end of an operating member or rod 8, the other end of which projects beyond the end wall 9 of a casing 4 and has fixed thereon a finger-piece 10. The rod 8 extends centrally through a tubular actuating member 11, upon the outer end of which there is fixed a turn-piece or disk 12, by which the member may be rotated, there being mounted upon said member, which is free from engagement with the receptacle, a plurality of tubular sleeves or thimbles 13, spaced one from another and each having its opposite ends reversely screw-threaded, or, in other words, each sleeve has a right-hand and also a left-hand threaded portion. These sleeves are fixed for rotation with the tubular member 11 by means of transverse pins or studs 14, carried by the member and extending through longitudinally-disposed slots 15, provided in the sleeves, whereby the latter may have a certain amount of longitudinal play upon the actuating member.

Disposed upon and coupled by the sleeves 13 is a series of computing members 16, preferably in the form of tubular sections, which, conjointly with the sleeves, constitute an adjustable computing mechanism. The sleeves 13 are of uniform length and spaced equal distances apart upon the actuating-tube 11, while the sections 16, which are likewise of uniform length relative to one another and to the sleeves and are arranged to bridge the spaces between the latter, are of suitable internal diameter to telescopically receive the sleeves 13, with which they are in threaded engagement. Projecting from the sections or members 16 are primary and secondary pins or fingers 17 18, extending in opposite directions transversely from the sections and working in suitable longitudinally-disposed slots 19, provided in a tubular sheath or casing 20, which incloses the computing mechanism. The primary fingers 17, which are spaced equal distances apart longitudinally of the casing 20, are provided upon their outer ends with buttons or heads 21, designed to bear figures or characters indicating the price or quantities of material received by the scoop 5.

The casing 4 is provided with a discharge opening or spout 22, through which the contents of the receptacle 5 may be discharged.

In practice material escapes from the vessel 1 to the receptacle 5 during forward movement of the latter, which is effected by forward traction upon the rod 8. As the receptacle moves forward the buttons 21 will successively pass and be exposed through the wall 9 and will serve to indicate the distance which the receptacle has moved, and consequently the amount of material which it has received. When it has been thus indicated by the buttons that the proper or desired amount of material is contained in the receptacle, the latter, which is of circular form in cross-section, is rotated by rotating rod 8, thereby bringing the open side or mouth of the receptacle downward for discharging the material through opening 22, it being apparent that as the receptacle rotates it will act as a cut-off or closure for the opening 3, thereby checking the discharge of material from the vessel 1. When it is desired to regulate the computing mechanism for varying the relative travel of the receptacle according to variations in the price or quality of the material within the vessel 1, the actuating member 11 is rotated through the medium of the disk or head 12, thereby rotating the sleeves 13 relative to the members 16, which of course remain fixed against rotation by the fingers 17 18. Hence this rotation of the sleeves will, through their telescopic and threaded connection with the members 16, move the latter toward or from each other, thereby varying the spacing between the buttons 21, and consequently necessitating longer or shorter intervals of travel for the receptacle during the successive passage of the buttons through the wall 9, there being provided on the disk 12 suitable graduations 26, coacting with a fixed pointer or indicator 27 on a stationary portion of the casing, whereby this adjustment of the parts may be regulated. Thus it is apparent that by operating the mechanism to move the buttons toward one another they will in passing through the wall 9 necessitate a shorter movement of the receptacle, and consequently a smaller amount of material being received by the latter than when the buttons are moved away from one another.

In Figs. 5 and 6 there is disclosed a slightly-different form of embodiment of the invention, in which the receptacle 5 is fixed against longitudinal movement by means of a bolt or equivalent fastening device 23, but is free for rotation upon the latter as a pivot, said bolt being extended through the rear wall of the supplemental casing 4 and the rear end wall of the receptacle, which in the present instance is initially open at its forward end and normally closed by a movable shield or partition 6, formed by one end of a cylindrical body 6'. The cylinder in this instance is similar in construction to that shown in Fig. 1, except that it is here provided with a longitudinally-disposed lateral offset, 24, producing a pair of shoulders 25, which engage, respectively, the adjacent edges of the receptacle 5 for rotating the latter, it being apparent that said cylinder normally acts as a closure to prevent entrance of material into the receptacle except as the cylinder is moved forwardly longitudinally and that by regulating or graduating the forward movement of the cylinder the amount of material entering the receptacle may be accurately determined in a manner similar to that described in connection with Fig. 1. For imparting to and regulating the movement of the cylinder for the purpose just mentioned we have connected with the forward end of the latter an adjustable computing mechanism identical in construction and operation with that above described.

In order to control the rotation of the receptacle 5 for bringing its normally upper receiving-opening to discharging position, we have provided on the tubular casing 20, which surrounds the computing mechanism, a pin 28, traveling upon a semicircular way or track 29, provided at its terminals with stops 30 and 31. When the parts are in normal position for the receptacle to receive material from the overlying vessel, the pin 28 will be in contact with the stop 30, whereas when the receptacle is rotated to discharging position the pin will contact with the stop 31 and will at the same time, owing to the track being outwardly inclined, as indicated by dotted lines in Fig. 5, be pressed into contact with the adjacent face of a protecting-case 32, which shields said parts and is attached to the wall 9. Thus the receptacle will be frictionally locked in discharging position.

From the foregoing it is apparent that we produce a simple device which will efficiently perform its functions to the attainment of the ends in view; but it is to be understood that various minor changes may be made in the details of construction herein set forth without departing from the spirit of the invention.

Having thus described the invention, what is claimed is—

1. The combination with a vessel, of a receptacle into which the vessel discharges material, a shield disposed within the receptacle, one of said parts being movable relative to the other to determine the amount of material discharged into the receptacle, a plurality of computing members, and means for relatively adjusting the members to regulate the movements of the movable part.

2. In a device of the class described, the combination with a vessel, of a movable receptacle into which the vessel discharges material, the amount of material discharged being determined by the movement of the receptacle, a plurality of computing members, and means for relatively adjusting the members to graduate the movements of the receptacle.

3. In a device of the class described, the combination with a vessel, of a movable receptacle into which the vessel discharges material, the amount of material discharged being determined by the movement of the receptacle, a plurality of tubular computing-sections disposed in endwise relation, and means for moving the sections toward and from each other to graduate the movements of the receptacle.

4. In a device of the class described, the combination with a vessel, of a movable receptacle into which the vessel discharges material, the amount of material discharged being determined by the movements of the receptacle, a plurality of tubular computing-sections, operating members designed to telescope therewith for adjusting the sections to graduate the movements of the receptacle, and means for actuating the operating members.

5. In a device of the class described, the combination with a vessel, of a movable receptacle into which the vessel discharges material, the amount of material discharged being determined by the movements of the receptacle, a plurality of tubular computing-sections, tubular operating-sleeves designed to telescope therewith for adjusting the members to graduate the movements of the receptacle, and a tubular actuating member extended through said parts and operatively connected with the sleeves.

In testimony that we claim the foregoing as our own we have hereto affixed our signatures in the presence of two witnesses.

CHARLES HENRY BOND.
WALTER CHRISTIAN MALOZ.

Witnesses:
  WILBUR H. KRAMER,
  DAVID HAUSMANN.